United States Patent [19]

Pryor et al.

[11] 3,947,363

[45] Mar. 30, 1976

[54] CERAMIC FOAM FILTER

[75] Inventors: Michael J. Pryor, Woodbridge, Conn.; Thomas J. Gray, Halifax, Canada

[73] Assignee: Swiss Aluminium Limited, Chippis, Switzerland

[22] Filed: Mar. 28, 1975

[21] Appl. No.: 563,212

Related U.S. Application Data

[63] Continuation-in-part of Ser. No. 430,229, Jan. 2, 1974, Pat. No. 3,893,917.

[52] U.S. Cl. ............... 210/510; 106/40 R; 106/41; 210/69
[51] Int. Cl.² ................ B01D 39/20; C04B 21/00
[58] Field of Search .............. 210/69, 510; 55/523; 106/40 R, 40 V, 41

[56] References Cited

UNITED STATES PATENTS

| | | | |
|---|---|---|---|
| 3,574,646 | 4/1971 | Wismer et al. | 106/41 |
| 3,747,765 | 7/1973 | Nowak | 210/510 X |
| 3,751,271 | 8/1973 | Kimura et al. | 210/510 X |
| 3,762,935 | 10/1973 | Leach | 106/40 R |
| 3,833,386 | 9/1974 | Wood et al. | 106/41 |

*Primary Examiner*—John Adee
*Attorney, Agent, or Firm*—Robert H. Bachman; David A. Jackson

[57] ABSTRACT

The present invention resides in an improved, high temperature resistant ceramic foam filter particularly useful for filtering molten metal, and also an aqueous slurry for use in preparing same.

12 Claims, No Drawings

CERAMIC FOAM FILTER

CROSS REFERENCE TO RELATED APPLICATION

This application is a continuation-in-part of copending United States patent application Ser. No. 430,229 for "Improved Molten Metal Filter" by Michael J. Pryor and Thomas J. Gray, filed Jan. 2, 1974, now U.S. Pat. No. 3,893,917.

BACKGROUND OF THE INVENTION

Porous ceramic foam materials are known in the art, for example, having been described in U.S. Pat. Nos. 3,090,094 and 3,097,930. These porous ceramic foam materials are known to be particularly useful in filtering molten metal, as described in the aforesaid copending application U.S. Ser. No. 430,229, now U.S. Pat. No. 3,893,917 for "Improved Molten Metal Filter" by Michael J. Pryor and Thomas J. Gray.

Molten metal, particularly molten aluminum, in practice generally contains entrained solids which are deleterious to the final cast metal product. These entrained solids appear as inclusions in the final cast product after the molten metal is solidified and cause the final product to be less ductile or to have poor bright finishing and anodizing characteristics. The inclusions may originate from several sources. For example, the inclusions may originate from surface oxide films which become broken up and are entrained in the resultant molten metal. In addition, the inclusions may originate as insoluble impurities, such as carbides, borides and others or eroded furnace and trough refractories.

It is naturally highly desirable to devise an improved filter for use in removing or minimizing entrained solids from the final cast product, particularly with respect to molten aluminum and especially when the resultant metal is to be used in a decorative product, such as decorative trim or sheet made from aluminum Alloy 5252.

Ceramic foam materials are known to be highly useful in filtering molten metal, particularly molten aluminum, as disclosed in the aforesaid copending application U.S. Ser. No. 430,229. It is highly desirable and it is a principal object of the present invention to devise a ceramic foam filter which has considerable high temperature resistance so that it can be used on a variety of molten metals and so that the structure thereof is resistant to degradation under the severe conditions of use associated with filtration of molten metal.

It is a further object of the present invention to devise a high temperature resistant ceramic foam filter as aforesaid which is convenient to prepare and is characterized by reasonable cost.

It is a still further object of the present invention to provide a high temperature resistant foam filter as aforesaid which does not contaminate the melt and does not result in degradation of desirable characteristics in the final metal product.

Further objects and advantages of the present invention will appear hereinafter.

SUMMARY OF THE INVENTION

In accordance with the present invention it has now been found that the foregoing objects and advantages may be readily obtained.

The present invention provides a highly efficient, ceramic foam material for use in filtering molten metal, especially molten aluminum. The ceramic foam material of the present invention is characterized by having an open cell structure with a plurality of interconnected voids surrounded by a web of said ceramic material. The filter of the present invention has a density of less than 30% of the theoretical density for a ceramic material of the same size. The composition of the ceramic foam material of the present invention is as follows: 40 to 95% $Al_2O_3$; 1 to 25% $Cr_2O_3$; 0.1 to 12% bentonite; and from 2.5 to 25% of a ceramic binder or air setting agent which is substantially nonreactive to the molten metal.

In addition to the foregoing, the present invention contemplates an aqueous slurry for use in preparing the foregoing high temperature resistant ceramic foam, wherein said slurry contains the materials listed above in the foregoing amounts.

DETAILED DESCRIPTION

In accordance with the present invention the ceramic foam filter described above has been found to be particularly useful in filtering molten metal, especially molten aluminum. The high temperature resistant characteristics of the filter of the present invention are particularly useful under the severe use conditions encountered in the filtration of molten metal. Furthermore, the composition of the ceramic filter of the present invention has been found to be such that there is no difficulty with contamination of the metal.

The ceramic filter of the present invention is a low cost material which may be conveniently used on a disposable basis. The molten metal is poured through the ceramic foam material at a rate of from 5 to 500 and preferably 30 to 100 cubic inches per square inch of filter area per minute and entrained solids are thereby removed from the molten metal. The filter material of the present invention is prepared in accordance with the procedure outlined in the aforesaid copending application U.S. Ser. No. 430,229. As described therein, an open cell, flexible organic foam material is provided having a plurality of interconnected voids surrounded by a web of said foam material. The aqueous slurry described above is prepared and the foam material is impregnated therewith so that the web is coated therewith and the voids are substantially filled therewith. The impregnated material is then compressed to expel from 20 to 75% of the slurry while leaving the web coated therewith. The compression is released so that the web remains coated with the slurry and the material is dried. The dried material is then heated to first burn out the flexible organic foam and then sinter the ceramic coating, thereby providing a fused ceramic foam having a plurality of interconnected voids surrounded by a web of bonded or fused ceramic in the configuration of the flexible foam. The foregoing procedure is fully described in the aforesaid copending application U.S. Ser. No. 430,229 and the disclosure of said copending application is hereby incorporated by reference.

The principal component of the ceramic foam material of the present invention is $Al_2O_3$ in an amount from 40 to 95% and preferably from 45 to 55%. $Al_2O_3$ is particularly desirable for use as a ceramic filter since it is not attacked by molten aluminium or molten copper, for example; whereas, silica is attacked by these materials. Furthermore, the alumina has reasonable strength to stand up to chemical attack and structural and/or mechanical strength to stand up to the particular elevated temperature conditions. In addition to the foregoing, the ceramic material of the present invention utilizes from 1 to 25% $Cr_2O_3$ and preferably 10 to 17% $Cr_2O_3$. This component is particularly significant since it has been found that it imparts significantly better high temperature resistance, that is, resistance to attack by the molten metal at elevated temperature.

Bentonite in an amount from 0.1 to 12% has been found to be a particularly important additive. Bentonite is a naturally occurring clay composed principally of aluminum and silicates, usually with some magnesium and iron. Of course, one could use a chemical equivalent or approximate the composition of this material. The bentonite component provides a small setting or binding function and produces some glassy phases upon firing yielding strength in the final product. The main function of the bentonite, however, is rheological. The bentonite component results in a slurry having highly desirable thixotropic properties, that is, resistance to flow at low rates of shear but satisfactory flow properties at high rates of shear. Thus, the bentonite component provides a slurry that will pour readily if vibrated or stirred and enables one to control the flowability of the slurry with respect to impregnation of the foam and retention in the foam after impregnation. In addition, the bentonite provides control of uniformity of retention of the slurry in the organic foam material during subsequent handling and rolling so that the thioxotropic properties imparted by the bentonite retards nonuniform redistribution of the slurry in the organic foam prior to setting. The preferred bentonite composition range is from 0.5 to 2%.

In addition to the foregoing, one provides from 2.5 to 25% of an air setting agent which is substantially nonreactive to the molten metal. The air setting or bonding agent sets up or hardens the ceramic slurry without the need for heating, and preferably by drying, normally by a chemical reaction, while heating to moderate temperatures. The preferred air setting agent is aluminum orthophosphate, preferably in the form of a 50% aqueous solution. Other air setting agents which may be employed include, for example, magnesium orthoborate, aluminum hydroxy chloride, etc. Alkaline metal silicates such as sodium silicates may be employed at least in part; however, these are less desirable since melting and consequent loss of set occurs at temperatures around 1500°F. Furthermore, the silicon contents thereof, and perhaps the sodium content, may become dissolved in the melt. Similarly, ethyl silicate and other phosphates may be employed but are less desirable. Aluminum orthophosphate is particularly preferred due to its very desirable combination of properties, that is, nonreactivity, stability over a wide range of temperatures and good setting properties.

As indicated hereinabove, the air setting agent is preferably added as an aqueous suspension including equal parts of binder and water particularly in the case of aluminum orthophosphate. The binder provides green strength before the formation of the ceramic bond, that is, after the burning off or volatilization of the web of flexible foam material. The binder material provides sufficient strength to hold the mixture together for formation of the final product. In fact, the stability and strength of the chemical bond provided by the preferred air setting agent is sufficient for many applications to enable use of the product at this stage without high temperature sintering. This strength is substantial and exists over a wide temperature range.

The preferred embodiment utilizes from 12 to 17% of aluminum orthophosphate.

Optionally and preferably a small amount of Kaolin is employed as an additional binder material and rheological agent. Kaolin is a clay composed of mainly alumina and silica. Of course, one could use a chemical equivalent or approximate the composition of this material. From 0.1 to 12% of kaolin may be employed and preferably from 2 to 5% thereof. Kaolin provides a similar function as the bentonite, produces some glassy phases upon firing and provides additional strength in the final product. The kaolin component is not as effective as bentonite in providing desirable thixotropic properties, but is relatively low in cost and is particularly useful in combination with the bentonite.

Naturally, additional ceramic materials or additives may be utilized if desired to achieve a particular property. For example, up to 15% of such materials as mullite, zirconia, magnesia and the like may be employed in addition to the alumina and/or chromia components or in substitution therefor. The highly desirable properties of the present invention are provided by the aluminachromia ceramic materials in combination with the other components of the present invention; therefore, excessive amounts of additional ceramic materials should be avoided. The combination of alumina and chromia is particularly advantageous in that it resists penetration by a variety of metals and slags, such as aluminum or copper or magnesium, and their oxides, etc.

As indicated hereinabove, the slurry is an aqueous slurry which contains a certain amount of water in order to aid in controlling viscosity so that one can impregnate the foam material with the slurry and also to enable one to work conveniently with the slurry. Generally from 10 to 40% water is present in the slurry with some of this water being added as an aqueous solution of the aluminum orthophosphate.

The resultant product is a bonded ceramic foam material having an open cell structure characterized by a plurality of interconnected voids surrounded by a web of ceramic, with the ceramic foam material generally having a density of less than 30% of the theoretical density for a ceramic material. Naturally, the ceramic foam may have any desired configuration based on the configuration needed for the particular molten metal filtration process. Although naturally these configurations can be many and varied, particular configurations may be preferred for filtration in a transfer trough between the furnace and the casting mold in filtering molten aluminum. A wide variety of suitable configurations may be readily and conveniently prepared in view of the flexibility afforded by the preparation process utilized herein. It is a particular advantage of the ceramic foam material of the present invention that said ceramic foam has substantial high temperature strength and is capable of withstanding attack by molten metal. Furthermore, the filter of the present invention is advantageous in that excessive heads of molten metal are not required in order to start the filtration process.

In accordance with the present invention the specific features thereof will be more readily understandable from a consideration of the following illustrative examples.

EXAMPLE I

A polyurethane foam material was provided having a thickness of 2 inches and containing 30 pores per linear inch. An aqueous ceramic slurry was provided having the following composition: 47% $Al_2O_3$, 13% $Cr_2O_3$, 3.5% kaolin, 1.0% bentonite, 14 ½% colloidal aluminum orthophosphate added as an aqueous solution with an equal amount of water. The slurry contained 82% solids and 18% water. The foam material was immersed in the slurry and kneaded to remove air and substantially fill the voids with the slurry and also to coat the fibrous webs of the foam with the slurry. The resultant impregnated foam was removed from the slurry and subjected to compression to squeeze approximately 50% of the slurry out of the foam by passing the impregnated foam through preset rollers. The foam material sprung back to its original dimension after passing through the rollers and had the fibrous urethane filaments coated with a substantially uniform residue of the ceramic slurry. The material was oven dried at 125°C for 1 hour, heated slowly at a heat up rate of 0.5°C per minute to 500°C to drive off the water and allow the polyurethane fibers to volatilize and/or burn out without collapsing the ceramic and without destroying the filamentary ceramic configuration. The foam was held at 500°C for 1 hour and was subsequently heated to 1350°C at a rate of 1°C per minute, held at 1350°C for 5 hours to permit the ceramic to sinter together and thereby provide an open cell ceramic foam material having a configuration of the original polyurethane foam material.

EXAMPLE II

A 50,000 lb. charge of aluminum Alloy 5252 containing 2.3% magnesium, 0.04% silicon, 0.05% iron and 0.06copper was melted in a gas fired open hearth furnace and fluxed with chlorine gas according to conventional practice. This unfiltered metal was then cast into three 20 inch × 53 inch cross section rolling ingots weighing 10,000 lbs. each.

A second charge of the same composition was melted and prepared for casting in accordance with the same practice except, however, the metal was passed through the ceramic foam filter prepared in Example I installed in the pouring trough before the metal was cast into rolling ingots. A metal head of only 6 inches was required to prime the filter and during the casting the running head loss built up from ⅛ to 1 inch after 30,000 lbs. of metal has been filtered therethrough.

Pressure filter tests were run on metal taken from upstream and downstream of the filter during the casting of the filtered metal and from the pouring trough during the casting of the unfiltered metal. The filtration affect of the ceramic foam filter of the foam of the present invention proved to be excellent. Cross sections of the pressure filter disc from the unfiltered metal were compared with cross sections of the pressure filter disc from the filtered metal. These cross sections clearly showed that little or no residue was present in metal filtered with ceramic foam filter of the present invention; whereas, considerable amounts of residue existed in the cross section of the pressure filter disc from the unfiltered metal. Similarly, a pressure filter disc was obtained upstream of the ceramic foam filter and resulted in the presence of considerable residue therefrom. This clearly shows the effectiveness of the ceramic foam filter of the present invention.

The pressure filter test described above is a method of concentrating and examining the nonmetallic particulate in a 20 to 25 lb. sample of molten aluminum. The molten aluminum in this test is carefully ladled into a preheated 25 lb. clay graphite crucible into the base of which is set a 30 mm diameter, 3 mm thick porous silica disc plug. 90% of the metal is forced through the disc by application of air pressure and the remaining metal solidified in situ. The disc and adjacent metal are then sectioned, polished and examined by normal metallographic techniques to reveal the quantity of nonmetallics filtered out.

The ceramic foam filter of the present invention was examined after the filtration of said aluminum alloy therethrough in accordance with this example and found to have excellent high temperature strength with resistivity to penetration and attack by the metal or slag filtered therethrough.

This invention may be embodied in other forms or carried out in other ways without departing from the spirit or essential characteristics thereof. The present embodiment is therefore to be considered as in all aspects illustrative and not restrictive, the scope of the invention being indicated by the appended claims, and all changes which come within the meaning and range of equivalency are intended to be embraced therein.

What is claimed is:

1. A high temperature resistant ceramic foam filter for use in filtering molten metal having an open cell structure characterized by a plurality of interconnected voids surrounded by a web of said ceramic, said filter having a density of less than 30% of the theoretical density for ceramic material of the same size, said foam having the followig composition: 40 to 95% $Al_2O_3$; 1 to 25% $Cr_2O_3$; 0.1 to 12% bentonite; and 2.5 to 25% of an air setting agent which is substantially nonreactive to the molten metal.

2. A filter according to claim 1 containing from 0.1 to 12% kaolin.

3. A filter according to claim 2 containing 2 to 5% kaolin.

4. A filter according to claim 2 containing from 45 to 55% $Al_2O_3$.

5. A filter according to claim 2 containing from 10 to 17% $Cr_2O_3$.

6. A filter according to claim 2 containing from 0.5 to 2% bentonite.

7. A filter according to claim 2 wherein said air setting agent is aluminum orthophosphate.

8. A filter according to claim 7 containing from 12 to 17% colloidal aluminum orthophosphate.

9. An aqueous slurry for use in preparing a high temperature resistant ceramic foam having the following composition: 40 to 95% $Al_2O_3$; 1 to 25% $Cr_2O_3$; 0.1 to 12% bentonite; and 2.5 to 25% of an air setting agent which is substantially nonreactive to the molten metal.

10. A slurry according to claim 9 containing from 10 to 40% water.

11. A slurry according to claim 9 including from 0.1 to 12% kaolin.

12. A slurry according to claim 11 wherein said air setting agent is aluminum orthophosphate.

* * * * *

UNITED STATES PATENT AND TRADEMARK OFFICE
Certificate

Patent No. 3,947,363                           Patented March 30, 1976

Michael J. Pryor and Thomas J. Gray

Application having been made by Michael J. Pryor and Thomas J. Gray the inventors named in the patent above-identified, and Swiss Aluminum Limited, the assignee, for the issuance of a certificate under the provisions of Title 35, Section 256, of the United States Code, adding the names of John C. Yarwood, James E. Dore, and Robert K. Preuss as joint inventors, and a showing and proof of facts satisfying the requirements of the said section having been submitted, it is this 27th day of Mar., 1984, certified that the names of the said John C. Yarwood, James E. Dore, and Robert K. Preuss are hereby added to the said patent as joint inventors with the said Michael J. Pryor and Thomas J. Gray.

Fred W. Sherling,
*Associate Solicitor.*